(12) United States Patent
Tamaoki

(10) Patent No.: US 7,204,651 B2
(45) Date of Patent: Apr. 17, 2007

(54) PRINTER

(75) Inventor: Ryoji Tamaoki, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/963,758

(22) Filed: Oct. 14, 2004

(65) Prior Publication Data

US 2005/0152728 A1    Jul. 14, 2005

(30) Foreign Application Priority Data

Oct. 14, 2003   (JP) .......................... P2003-353215

(51) Int. Cl.
    *B41J 5/30*    (2006.01)
(52) U.S. Cl. ....................................... 400/68
(58) Field of Classification Search ................. 400/61, 400/63, 68; 399/9, 13
    See application file for complete search history.

(56) References Cited

U.S. PATENT DOCUMENTS

| | | | |
|---|---|---|---|
| 6,546,212 B1 * | 4/2003 | Ogata et al. ................. | 399/24 |
| 6,672,695 B1 * | 1/2004 | Naka et al. ................... | 347/7 |
| 6,708,005 B2 * | 3/2004 | Chihara ........................ | 399/12 |
| 2002/0164168 A1 * | 11/2002 | Hayakawa ................... | 399/12 |

FOREIGN PATENT DOCUMENTS

| | | |
|---|---|---|
| JP | 2001-166649 A | 6/2001 |
| JP | 2001-228760 A | 8/2001 |
| JP | 2001-232809 A | 8/2001 |
| JP | 2002-264435 A | 9/2002 |
| JP | 2003-84631 A | 3/2003 |
| JP | 2003-154734 A | 5/2003 |

* cited by examiner

*Primary Examiner*—Judy Nguyen
*Assistant Examiner*—Wynn Q. Ha
(74) *Attorney, Agent, or Firm*—Sughrue Mion, PLLC

(57) ABSTRACT

A printer on which a cartridge for printing having a recording element is mounted includes a receiving part for receiving information which has date information showing a current date and a writing part for writing the date information of the information received by the receiving part in the recording element of the cartridge.

2 Claims, 2 Drawing Sheets

PRINTER

BACKGROUND OF THE INVENTION

The present invention relates to a printer on which a cartridge for printing having a recording element is mounted and used.

As well known, most of existing printers are devices on which cartridges (refer them to as cartridges for printing, hereinafter) filled with image forming materials (toner, ink) are mounted and used. Further, these printers are devices (see, for instance, JP-A-2003-84631 and JP-A-2003-154734) in which various kinds of information (residual quantity of image forming materials, number of printing sheets, etc.) related to the states of the cartridges for printing are recorded in recording elements (EEPROM or the like) provided in the cartridges for printing. In the above-described printers, there are printers having timer mechanisms (what is called a real time clock) that can output information showing a current date and functions for writing the outputs (that is, date information) of the timer mechanisms in the recording elements on the cartridges for printing when new cartridges for printing are mounted.

When printers to be produced (sold) have the above-described functions, the date information recorded in the recording elements of the cartridges for printing recovered from users is employed. Thus, the efficient production plan of the cartridges for printing can be formed and more excellent services can be provided to the users.

SUMMARY OF THE INVENTION

However, since all the existing printers having the above-described functions is provided with the timer mechanisms, the printers are relatively expensive.

The present invention is provided by considering the above-described circumstances and it is an object of the present invention to provide a printer that has a function for recording date information in a recording element on a cartridge for printing and can be inexpensively produced.

In order to achieve the above-described object, according to the present invention, a printer on which a cartridge for printing having a recording element is mounted and used includes an information receiving part for receiving information including date information showing a date at that time and a date information writing part that performs a process for writing the date information included in the information received by the information receiving part in the recording element of the cartridge for printing when prescribed conditions are satisfied.

That is, according to the present invention, the printer obtains the date information recorded in the recording element of the cartridge for printing from an external device (the information receiving part receives the date information). Accordingly, according to the present invention, the printer having a function for recording the date information in the recording element on the cartridge for printing can be produced without mounting a timer mechanism (that is, at low cost).

For realizing the printer of the present invention, an information writing part may be employed, as the date information writing part, that writes date information included in information in the recording element of the cartridge for printing as use starting date information when the information receiving part receives the information under a state that the use starting date information is not recorded in the recording element, and writes date information included in information in the recording element of the cartridge for printing as use end date information when the information receiving part receives the information under a state that the use end date information is not recorded in the recording element. Further, for realizing the printer of the present invention, information received by the information receiving part may be set to printing data including the date information.

BRIEF DESCRIPTION OF THE DRAWINGS

The above-described object and effects of the present invention will be more apparent from an explanation of the detailed description of a preferred embodiment with reference to the accompanying drawings, wherein.

DETAILED DESCRIPTION OF THE PREFERRED EMBODIMENT

Figure 1:
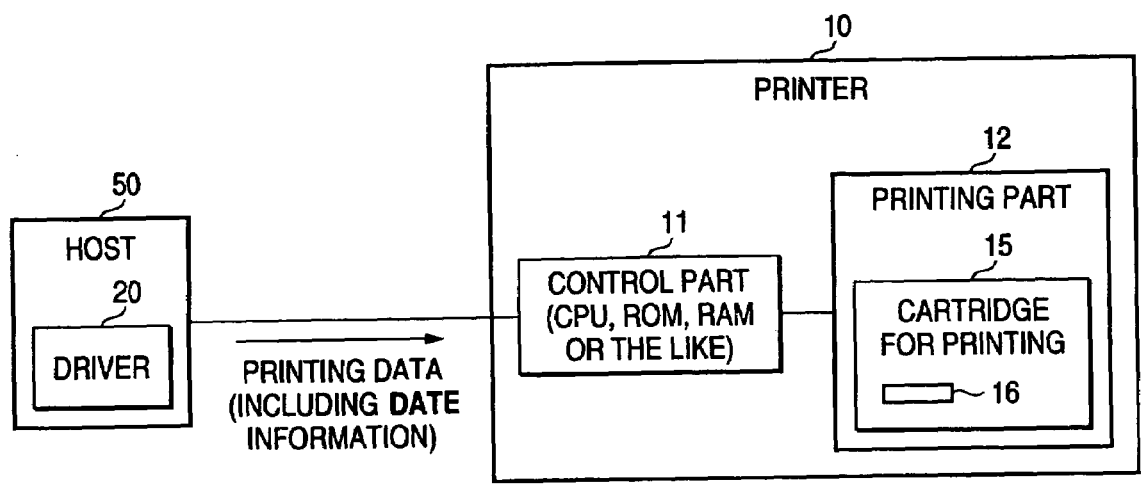
FIG. 1 is a block diagram showing the structure of a printer according to one embodiment of the present invention.

Now, the best mode for carrying out the present invention will be described below in detail by referring to the drawings.

As shown in FIG. 1, a printer 10 according to one embodiment of the present invention includes a control part 11 and a printing part 12 as main components, and the printer 10 is directly connected or connected through a network to a host 50 for transmitting printing data including date information and used. The host 50 is a computer in which a printer driver 20 for the printer 10 is installed. The date information is information (information controlled by the OS of the host 50) representing a date at the time of transmitting the printing data. The printing data including the date information indicates the printing data including the date information of the above-described contents in a header part that is formed and transmitted by the printer driver 20.

The printing part 12 configured as a part of the printer 10 is a unit that uses an image forming material (toner in this embodiment) with which a mounted or attached cartridge 15 for printing is filled to perform a printing operation (an image having the contents corresponding to data from the control part 11 is formed on a sheet). The cartridge 15 for printing mounted on or attached to the printing part 12 (attached to the printer 10) is provided with a nonvolatile recording element 16 for recording a residual quantity of toner, use starting date information, use end date information or the like. The printing part 12 has a function for changing the value of the residual quantity of toner recorded on the nonvolatile recording element 16 to a value of quantity representing a current state (a function for grasping the residual quantity of toner and rewriting the value of the residual quantity of toner recorded on the nonvolatile recording element 16 on the basis of the result thereof).

Further, the printing part 12 also has a function for responding to a reading request for the residual quantity of toner, a reading request/writing request for the use starting date information and a reading request/writing request for the use end date information or the like from the control part 11.

The control part 11 configured as a part of the printer 10 is a unit composed of a CPU, a ROM, a RAM or the like for causing the printing part 12 to perform a printing operation.

Figure 2:
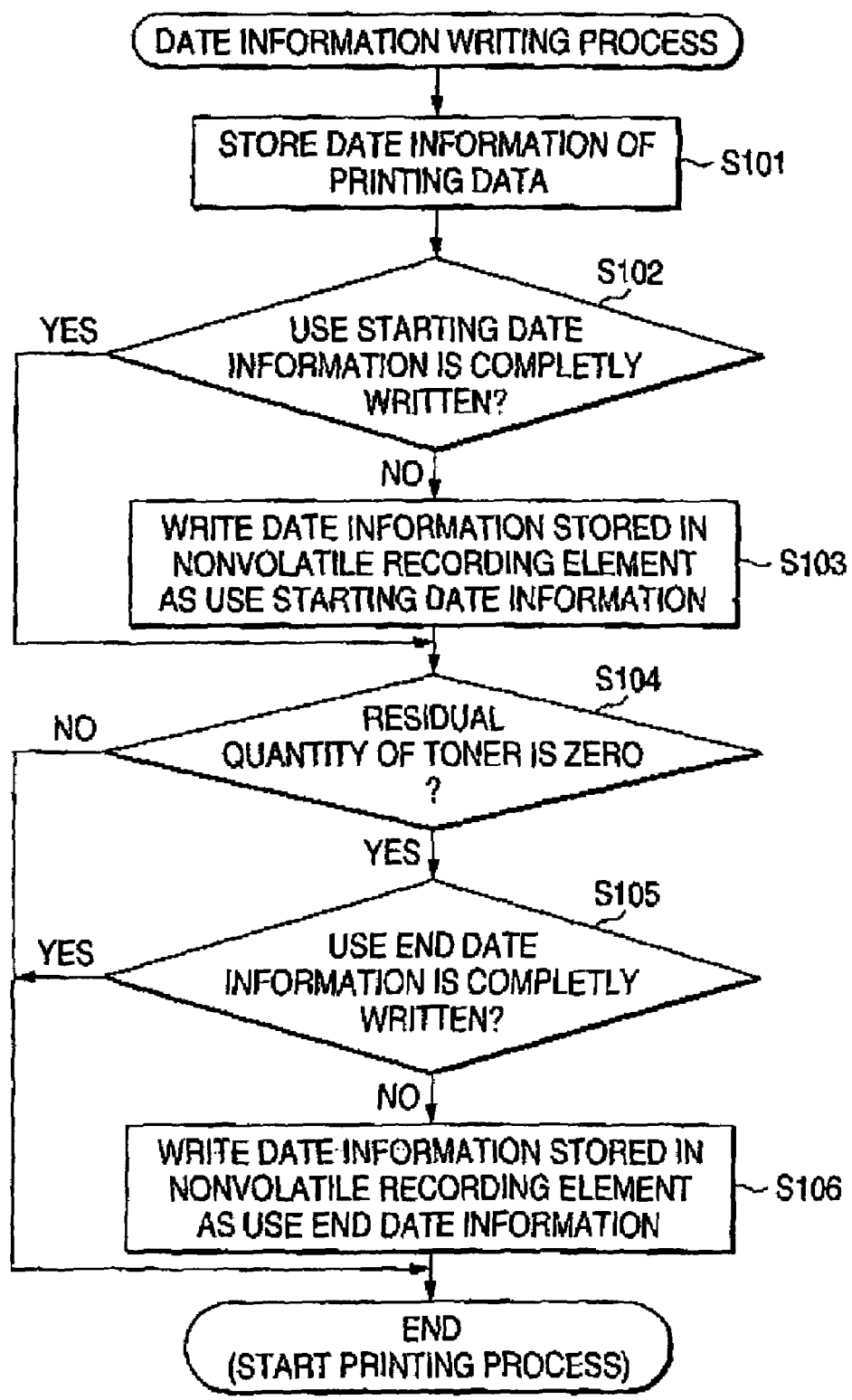
FIG. 2 is a flow chart of a date information writing process performed by the printer according to the embodiment of the invention.

The control part 11 performs date information writing processes of a procedure shown in FIG. 2 before a process in which the printing part 12 is caused to perform a printing operation of the contents corresponding to the printing data is started upon receiving the printing data.

Specifically, the control part 11 which receives the printing data (the control part 11 starting the date information writing processes) firstly stores the date information included in the received printing data therein (in a self-unit) (step S101). Then, the control part 11 performs a process (step S102) for deciding whether or not the use starting date information is written in the nonvolatile recording element 16 (whether or not effective use starting date information is recorded in the nonvolatile recording element 16). More specifically, the control part 11 performs a process for outputting the reading request for the use starting date information to obtain information recorded in the nonvolatile recording element 16 as the use starting date information from the printing part 12 and a process for deciding whether or not the information is information representing a date.

When the use starting date information is not written in the nonvolatile recording element 16 (the step S102; NO), the control part 11 performs a process (step S103) for writing the date information recorded therein in the nonvolatile recording element 16 as the use starting date information. That is, in the step S103, the control part 11 performs a process for outputting the writing request for the use starting date information including the date information recorded therein to the printing part 12. Then, the control part 11 that finishes the process of the step S103 starts processes after step S104.

On the other hand, when the use starting date information is written in the nonvolatile recording element 16 (the step S102; YES), the control part 11 starts the processes after the step S104 without especially performing a process. The control part 11 firstly decides whether or not the residual quantity of toner of the cartridge 15 for printing is "0" (the step S104). That is, the control part 11 outputs the reading request for the residual quantity of toner to obtain the residual quantity of toner recorded in the nonvolatile recording element 16 from the printing part 12 and decide whether or not the toner information is "0".

Then, when the residual quantity of toner is not "0" (the step S104; NO), the control part 11 finishes the date information writing processes to start a printing process (a process carried by the printing part 12 to perform a printing operation of the contents corresponding to the printing data).

On the other hand, when the residual quantity of toner is "0" (the step S104; YES), the control part 11 decides whether or not the use end date information is written in the nonvolatile recording element 16 (step S105).

Then, when the use end date information is not written in the nonvolatile recording element 16 (the step S105; NO), the control part 11 performs a process (step S106) for writing the date information recorded therein in the nonvolatile recording element 16 as the use end date information, and then, finishes the date information writing processes. On the other hands, when the use end date information is written in the nonvolatile recording element 16 (step S105; YES), the control part 11 finishes the date information writing processes immediately. The control part 11 that finishes the date information writing processes starts the printing process.

As described above, the printer 10 according to the embodiment of the present invention obtains from the host 50 the date information to be recorded in the nonvolatile recording element 16 on the cartridge 15 for printing as the use starting date information and the use end date information. Accordingly, although in the printer 10, the date information is recorded in the nonvolatile recording element 16, the printer 10 does not need to mount the timer mechanism thereon. Thus, when the structure of the printer 10 is employed, various kinds of printers having functions for recording date information in recording elements on cartridges for printing can be inexpensively produced.

<MODIFIED EMBODIMENT>

The above-described printer 10 may have various kinds of modifications. For instance, as the printer driver 20, a printer driver for separately transmitting date information and printing data (for instance, when the driver is selected itself, the date information is transmitted to the printer 10) may be used. The printer 10 may be modified to a device that performs the data information writing processes (FIG. 2) upon receiving the date information. Further, it is to be understood that the printer 10 may be modified in such a way that information other than the use starting date information and the use end date information is recorded in the nonvolatile recording element 16, or the printer 10 may be modified in such a way that not the date information, but data and hour information is recorded in the non-volatile recording element 16.

As described above, the printer according to the present invention is a device for writing the date information obtained from outside the printer in a recording element by using the existing cartridge for printing which has the recording element.

What is claimed is:

1. A printer which is adapted to attach a cartridge for printing having a recording element thereto and which is connected to a host, the printer comprising:

a controller, which receives printing data including date information representing a date on which the printing data is transmitted from the host, and which determines whether starting date information of the cartridge is recorded in the recording element; and a recorder, which records the date information on the recording element as the starting date information of the cartridge when the controller determines that starting date information is not recorded in the recording element of the cartridge;

wherein the controller determines whether the starting date information of the cartridge is recorded in the recording element, whether the residual amount of toner stored in the cartridge is empty, and whether end date information of the cartridge is recorded in the recording element; and wherein the recorder records the date information on the recording element as the end date information of the cartridge, when the controller determines the starting date information is recorded on the recording element of the cartridge, the residual amount of the toner stored in the cartridge is empty, and the end date information of the cartridge is not recorded in the recording element.

2. The printer as set forth in claim 1, further comprising:

a printing unit, which performs a printing process of the printing data after the recorder records the date information on the recording element.

* * * * *